Feb. 14, 1950     B. W. SHERER     2,497,240
CART
Filed Oct. 20, 1947
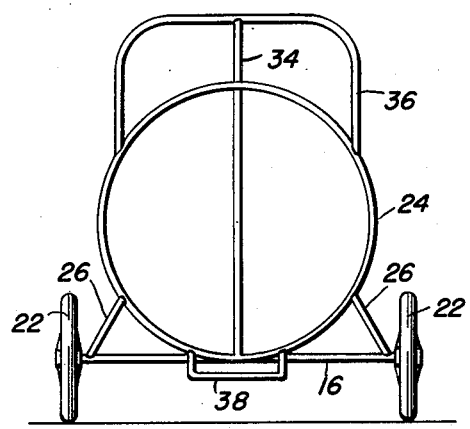
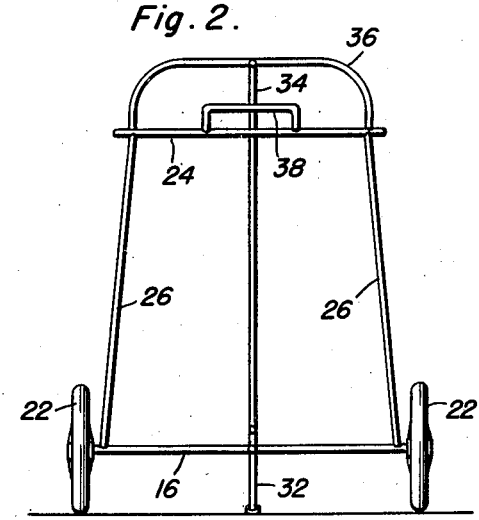
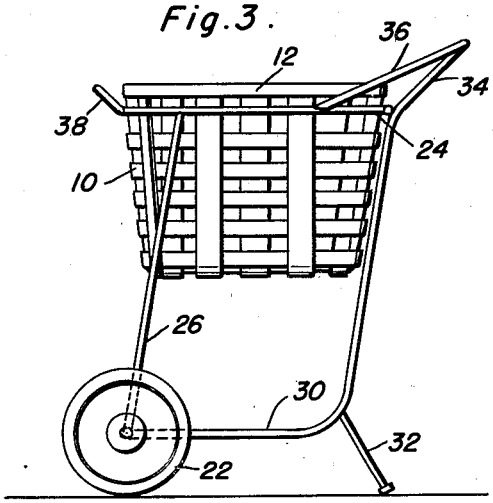
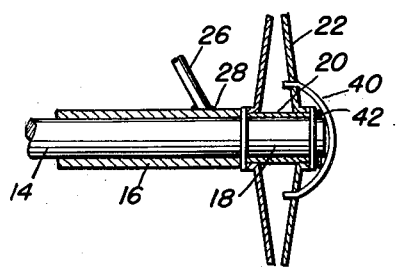
Inventor
Brice W. Sherer
By Clarence A. O'Brien and Harvey B. Jacobson
Attorneys Patented Feb. 14, 1950

2,497,240

UNITED STATES PATENT OFFICE 2,497,240

CART

Brice W. Sherer, Kismet, Kans.

Application October 20, 1947, Serial No. 780,939

1 Claim. (Cl. 280—51)

This invention relates generally to hand trucks and more particularly to a cart specially designed for affording and transporting laundry baskets of conventional round or "bushel" character.

It is well understood that several trucks of the same general character as this invention have been developed and patented, the present invention being conceived as an improvement on the subject matter of the patent issued to G. R. Amon, on December 19, 1922, under No. 1,439,392, and others. It is not therefore desired to claim such construction broadly, but what is desired to be secured by Letters Patent includes certain refinements and improvements in structure whereby a cart of improved functional characteristic is obtained.

A primary object of this invention is to provide a cart for laundry baskets in which the frame may be manufactured from round stock, and in which a minimum quantity of material is required.

Another object of this invention is to provide a cart for laundry baskets in which the basket is supported by the top rim thereof on a simple ring incorporated with the upper portion of the cart and the upright members of the same together with this ring comprise a cage for the baskets, the support of the baskets within the cart being thus reduced to ultimate simplicity and the basket being firmly held in place.

Still other objects of this invention include the provision of specific handle structure whereby the said ring is braced, and whereby a wide triangular base is provided to firmly support the frame and a rest incorporated with the rear portion of the frame is allowed to contact the ground or floor.

And a last object to be specifically mentioned is to provide a cart of this character which is relatively inexpensive and practicable to manufacture, which is extremely simple and convenient to use under many varied conditions, and which will give generally efficient and durable service.

With these objects definitely in view, together with other objects which will appear hereinafter as the description proceeds, this invention resides in certain novel features of construction, combination and arrangement of parts and portions as will be hereinafter described in the specification, particularly pointed out in the appended claim, and illustrated in the accompanying drawings which form a material part of this application, and in which:

Figure 1 is a top plan view of the cart;

Figure 2 is a front elevational view of the cart;

Figure 3 is a side elevational view of the cart with a laundry basket of "bushel" type supported in the ring of the frame; and, Figure 4 is an enlarged detailed fragmentary view of one end of the axle with a wheel operatively supported thereon.

Similar characters of reference designate similar or identical parts and portions throughout the specification and throughout the different views of the drawing.

Referring now to the drawing in detail, it will be noted that the environment wherewith this invention is adapted to be used includes a round or "bushel" type basket 10 having an upper rim portion 12 of greater diameter than the upper part of the wall of the basket. The cart is comprised of a wheeled frame constructed from round stock and is provided with a transversely disposed axle 14 which is enclosed throughout the major portion of its length by a sleeve 16. The ends of the axle projecting beyond the ends of the sleeve 16 comprise journals 18 for the bearings 20 of a pair of wheels 22. It should be noted that the length of the axle 14 is considerably greater than the diameter of the basket supporting ring 24 subsequently described.

A pair of substantially upright members 26 are secured at their lower ends to the sleeve 16, as by welding indicated at 28, and an L-shaped member 30 is also secured at its lower end to this sleeve. The upper ends of the upright members 26 and the L-shaped member 30 are secured to the ring 24, so that the frame is generally triangular, and a rest 32 is rigidly secured to the heel portion of the L-shaped member 30. It should be carefully noted that when the rest 32 is in contact with the ground, the ring 24 is substantially horizontal. This is an important feature of the invention from a practical view point, inasmuch as the operator of the device desires to have the baskets held in level position so that the basket may be filled with heavy material such as wet clothes and supported for considerable periods of time in the cart without being deformed as a result of the dampness and weight of its contents, it being understood that the basket will not be deformed as readily when held in an upright position, and it will be further understood that the periods of time when the cart is actually being moved will be substantially shorter than the periods of time when the basket is being merely supported by the cart. With this in view, the relatively long axle and the rest 32 are arranged and proportioned in order to support the basket properly, as best indicated in Figure 3.

The L-shaped member 30 is extended upwardly, as at 34, beyond the ring 24 and a handle 36 is terminally secured to the ring 24 on each side of this extending portion 34, the handle being generally U-shaped and being welded or otherwise secured centrally to the upper end of the extending portion 34. The handle 36 thus comprising a brace as well as handle.

Another handle 38 of similar form but of smaller dimension is secured to the front side of the ring 24.

It will be understood that many minor variations may be made in this invention, the exact type of wheel 22 to be used being thought immaterial, although it is preferred that the wheel construction shall include a hub cap 40 adapted to cover the end of the axle 14 and the wheel retaining means incorporated with the wheel, such as the cotter pin 42.

The operation of this invention will be clearly understood from the foregoing description of the mechanical details thereof, taken in connection with the above description of the objects sought to be achieved by this invention, and a further discussion of details of construction and operation is deemed unnecessary. In recapitulation, it should be noted that the device is primarily designed for laundry work, although the cart may advantageously be used in the gathering of fruit and the like, since a very similar basket is conventionally used for this latter purpose and the construction of the cart renders the same applicable for such general use.

Having described the invention, what is claimed as new is:

A cart for laundry baskets comprising a pair of substantially upright frame members, a basket supporting ring secured to and between the upper ends of said frame members, an axle housing secured to and between the lower ends of said frame members, an axle in said axle housing and ground contacting wheels on the ends of said axle, an L-shaped member having its lower end secured to said axle housing and an upper portion thereof secured to said ring, said frame members coacting with said L-shaped members and said ring to support a basket, a rest rigidly secured to the heel of said L-shaped member to contact the floor or ground when the ring is substantially horizontal.

BRICE W. SHERER.

REFERENCES CITED

The following references are of record in the file of this patent:

UNITED STATES PATENTS

| Number | Name | Date |
| --- | --- | --- |
| 577,089 | Waring | Feb. 16, 1897 |
| 962,025 | Holloway | June 21, 1910 |